Feb. 28, 1939.    J. J. GOUGH    2,149,049
ELECTRIC CONNECTOR-SWITCH
Filed Oct. 7, 1937
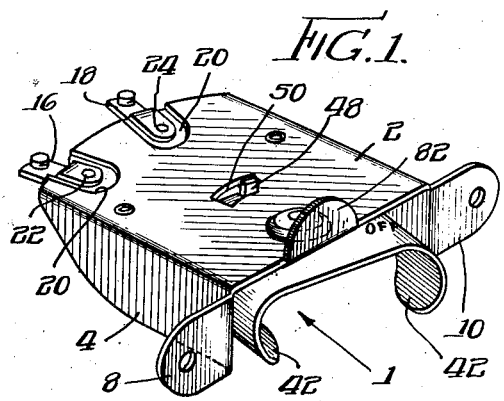
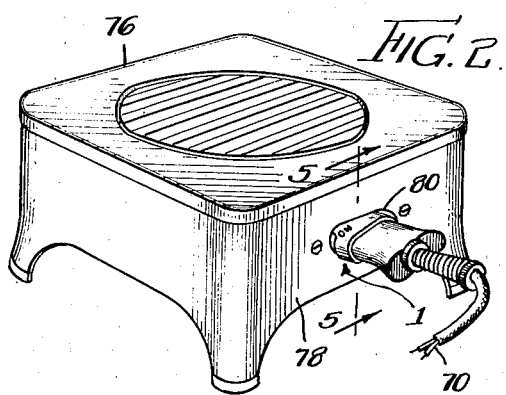
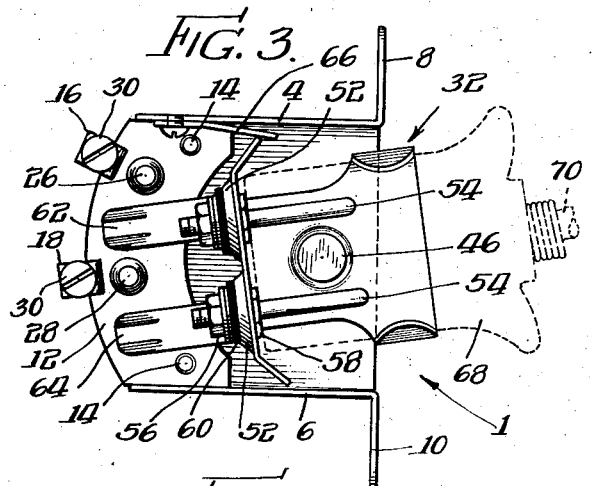
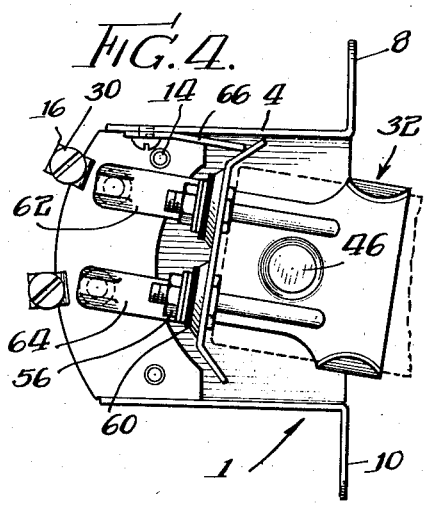
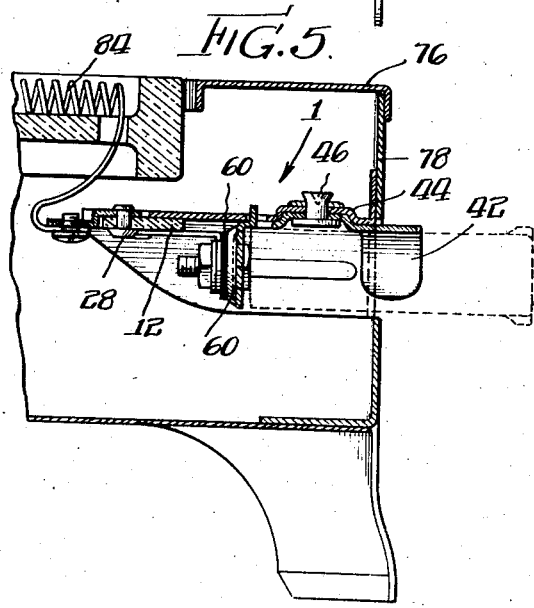
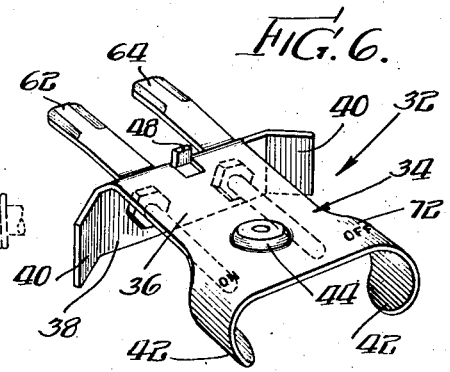
Inventor:-
James J. Gough
By:- Cox & Moore
attys.

Patented Feb. 28, 1939

2,149,049

UNITED STATES PATENT OFFICE 2,149,049

ELECTRIC CONNECTOR-SWITCH

James J. Gough, Chicago, Ill., assignor to Chicago Electric Manufacturing Company, Chicago, Ill., a corporation of Illinois Application October 7, 1937, Serial No. 167,799

7 Claims. (Cl. 200—51)

This invention relates to a combined connector and switch device and more particularly to a connector-switch device for use with electric appliances such as electric heating devices.

It is an object of this invention to provide an inexpensive, efficient, and readily operable connector and switch unit for use with electric appliances, more particularly electric heating devices.

Another object of the invention is to provide a combined connector and switch unit which shall be fully shock proof. Many electric appliances are commonly equipped with a control switch which upon operation opens one supply wire or lead of the appliance while leaving the other supply wire or lead connected to the supply cable. The danger of electric shock is therefore ever present, it being a matter of common experience to receive a shock from a supposedly disconnected appliance. This danger is particularly acute in the case of electric stoves or grills where the electrically energized heating element is totally or partially exposed.

It is therefore an important object of applicant's invention to provide a combined connector and switch which will eliminate this danger of shock.

A further object of the invention is to provide a connector and switch for use with an electric appliance in which the switch may be operated by either laterally pulling upon the supply cable in the event that the connector unit becomes heated or by laterally shifting the attaching plug.

A still further object of applicant's invention is the provision in an electric appliance of a combined connector-switch unit embodying a single-throw, double-pole switch readily operable to completely disconnect the appliance from its supply source and effectively eliminating any possibility of shock when the appliance is disconnected.

Applicant's invention contemplates a compact, substantially flat, readily attachable connector and switch unit for use with household electric appliances.

Other and further objects and advantages will be apparent from the following description when taken in connection with the accompanying drawing, wherein:

Fig. 1 is a view in perspective of a combined connector switch unit embodying the invention.

Fig. 2 is a view in perspective of a portable electric stove equipped with the connector-switch unit of Fig. 1.

Figs. 3 and 4 are bottom plan views of the connector-switch unit showing the different positions of operation of the same.

Fig. 5 is a fragmentary vertical section taken on the line 5—5 of Fig. 2.

Fig. 6 is a view in perspective of a portion of the unit.

As shown in the drawing for purposes of illustration, a preferred embodiment of a connector-switch unit 1 in accordance with the invention, comprises a supporting plate 2, preferably of sheet metal, having side flanges 4 and 6 provided with outwardly bent attaching lugs 8 and 10. An arcuate strip 12 of insulating material is secured to the supporting plate 2 between the flanges 4 and 6 at the end opposite the attaching lugs 8 and 10. This strip may be secured in any desired manner as by rivets 14. Suitable terminal strips, such as 16 and 18, are secured to the under surface of the insulating strip 12 within slots 20 in the supporting plate 2. These terminal strips 16 and 18 may be secured in any preferred manner, as, for example, by rivets 22 and 24 providing contact buttons 26 and 28, respectively. The terminal strips 16 and 18 may be provided with the customary attaching screws 30 by which the wires of the electric appliance may be connected thereto.

A combined plug receiving and switch operating member 32 (as best shown in Fig. 6) may comprise a plate 34, preferably of sheet metal bent to provide a substantially flat body portion 36, a laterally extending flange 38, one or more angularly inclined lugs 40 and a pair of laterally extending, curved fingers 42. The flat body portion 36 is provided with a suitable depression forming a boss 44 to receive a pin or rivet 46 by which the member 32 is pivotally mounted on the supporting plate 2 adjacent its outer edge. It is to be observed that the contact buttons 26 and 28, previously described, are angularly disposed about the axis of the pin as a center.

The body portion 36 is also provided with a struck out, laterally extending lug 48 adapted to be received in an arcuate opening 50 in the supporting plate 2, thereby to limit the pivotal movement of the member 32. The laterally extending flange 38 is provided with depressed portions forming bosses 52 to receive terminal prongs or pins 54. The prongs or pins 54 are preferably cylindrical in shape and are each threaded at one end for receiving clamping nuts 56 and 58. Insulating washers 60 are interposed between the clamping nuts 56 and 58 and each boss 52, and a suitable insulating bushing (not shown) surrounds each terminal prong and insulates the portion of the prong passing through the boss 52 from the member 32.

Contact blades 62 and 64 are provided with laterally extending portions which are apertured to receive the prongs 54 to which they are secured mechanically and electrically by the rear clamping nuts 56. The contact blades 62 and 64 extend outwardly of the flange 38 in position to engage the contacts 26 and 28, respectively. A resilient strip of spring steel 66 is secured at one end to one of the side flanges, for example the flange 4, and engages one of the inclined lugs 40 of the switch operating member 32 (as best shown in Figs. 3 and 4). This spring exerts a sufficient force against the switch member, as the same is rotated about its pivot pin 46 in a direction to break the circuit, to cause the contact blades to snap away from the contact buttons, thereby preventing the drawing of an arc between these blades and buttons. At the same time, the force exerted by the spring when the switch is in circuit closing position is insufficient to overcome the friction between the contact buttons and the contact blades and the inertia of the switch operating member.

The main body portion 36 and the paired fingers 42 depending therefrom are adapted to slidably receive the usual appliance plug 68 carried in the customary manner at one end of the extension cord or supply cable 70. The prongs 54 carried by the switch operating member 32 are received in the usual manner in the conventional blades (not shown) of the appliance plug 68. The upper surface of the main body portion 36 of the switch operating member 32 may be marked with suitable indicia 72 and 74, representing the "on" and "off" positions of the switch and such indicia may be so disposed as to be selectively covered and uncovered by the supporting plate 2 as the switch is operated from one position to the other.

It will be seen that the switch may be operated to its "on" and "off" positions by employing the attaching plug 68 as a handle, the cover of this plug being, as is conventional, of a suitable insulating material.

In the case of electric heating appliances, it often happens that the attaching plug becomes too hot to permit its handling. Where an electric heating device is equipped with applicant's connector-switch and the plug 68 should become too hot to handle, the switch may be readily operated by a force applied laterally of the cable without injury to the cable, the attaching plug or the switch operated thereby.

It will be seen that applicant's connector-switch unit 1 is substantially flat in vertical cross section and that the supporting plate 2 with its side flanges 4 and 6 form an effective housing for the unit whereby the unit may be assembled in any desired position in an electric appliance relative to the element to be electrically energized. In the case of an electric stove or grill 76 of the unit type (as shown in Figs. 2 and 5), the connector-switch unit may be secured to the inner surface of a vertical wall or flange 78 by means of the attaching lugs 8 and 10, suitable screws being received in the threaded openings provided in said attaching lugs. The wall or flange 78 is provided with an opening 80 to permit the passage therethrough of the main body portion 36 of the switch operating member 32. A lug 82, extending upwardly from the forward edge of the supporting plate 2, may engage the wall 78 of the grill to offer further support against the turning of the supporting plate 2 as the switch member 32 is operated. The opposite ends of the heating element or coil 84 of the grill 76 may be secured in any conventional manner to the terminal strips 16 and 18 by the attaching screws 30.

It will be observed that the electrically energized elements of the counter-switch unit 1 are insulated from the exposed elements of the unit and that the terminal prongs 54 are protected by the main body portion 36 of the switch operating member 32, thereby rendering the switch control unit fully shock proof. It will be further seen that both leads to the heating coil 84 are open when the switch is in "off" position; therefore it is impossible to get a shock by inadvertently touching or shorting the coil 84. The protective cover which is customarily employed to prevent inadvertent touching and shorting of the heating element may therefore be eliminated. Since this cover, as conventionally employed, necessarily reduces the heating efficiency of the stove, its elimination improves the heating efficiency of the stove.

Although applicant has shown a switch-connector formed to detachably receive the usual attaching plug, it will be evident that the connecting cord or supply cable 70 may be directly and permanently secured or soldered to the prongs 54 or their equivalent terminal means. In such case, of course, the switch operating member 32 may be directly operated by force applied to the fingers 42 or by a force applied laterally to the connecting cord 70.

It will also be evident that one of the contact buttons and its associated blade may be eliminated and one of the terminal prongs 54 connected directly to one end of the electrically energized element of the electric appliance. Where the connecting cord is permanently joined to a connector-switch unit having only a single operating blade, one of the wires of the connector cord may be connected directly to one end of the electrically energized element or to a fixed terminal to which one end of the electrically energized element is connected.

It will be seen from the above description that applicant has provided a particularly compact, inexpensive, efficient and readily operable connector and switch unit for use with electric heating appliances and that said unit is fully shock proof.

Changes may be made in the form, construction and arrangement of the parts without departing from the spirit of the invention or sacrificing any of its attendant advantages, and the right is hereby reserved to make all such changes as fairly fall within the scope of the following claims.

The invention is hereby claimed as follows:

1. A combined connector-switch unit for connecting a supply cord having an attaching plug for controlling the energization of an electric appliance, comprising in combination a supporting plate, means pivotally mounted on said supporting plate comprising terminals for receiving the attaching plug pivotally shiftable with said pivotal means, switch means mounted on said pivotal means and pivotal with said means to position to open or close said switch, and resilient spring means interengaging said supporting plate and a portion of said pivotal means and configurated for snapping the shiftable switch into open position upon manual initiation of movement of the terminal means.

2. A combined connector-switch unit for an electric appliance, comprising a fixed supporting plate, wire terminal receiving means pivotally mounted on said plate, and adapted to slidably receive said terminal in a plane normal to the line in which the pivot is arranged whereby transverse movement of the end of the wire will tend to move said pivotal means about its pivot, fixed contact means adapted to be connected to the appliance, shiftable switch means for cooperating with the fixed contact means, and means connecting said last mentioned switch means to said terminal means for movement therewith whereby the circuit to the electric appliance may be opened and closed by manual operation of said terminal means.

3. A combined connector-switch unit comprising a fixed supporting plate, terminal means adapted to be connected to a supply cable, means for pivotally mounting said terminal means on said supporting plate with the end of the cable adjacent the terminal means extending in a direction substantially perpendicular to the line in which the pivot means is arranged, contact means mounted on and insulated from said supporting plate, switch means electrically and operatively connected with said terminal means for cooperating with said contact means to make and break the circuit thereto, and means for causing said switch means to move with said terminal means whereby the circuit may be made and broken by force exerted upon the supply cable.

4. In an electric appliance comprising an element to be energized and a supply cord having an attaching plug at one end thereof, the combination of a fixed supporting plate, a terminal prong extending in a predetermined direction for receiving said attaching plug, pivotal means extending in a direction substantially perpendicular to the direction of said prong for pivotally mounting said terminal prong on said supporting plate and for supporting said attaching plug on said prong, a switch blade carried by said terminal prong and electrically connected thereto, a contact member mounted on and insulated from said supporting plate in position to engage said switch blade, said contact member being electrically connected to the element to be energized, whereby the circuit to said appliance may be opened and closed by force applied to the attaching plug.

5. A combined connector-switch unit for an electric appliance comprising a supporting plate, a switch operating member pivoted to said supporting plate, said member comprising a substantially flat body portion having laterally bent edge portions forming therewith a housing adapted to receive an attaching plug and having a laterally extending flange, said substantially flat body portion and supporting plate being arranged in parallel planes and said pivotal member extending in a direction generally normal thereto, terminal prongs mounted on said flange and adapted to engage said plug, switch blades mounted on said flange and having electrical connection with said prongs, fixed contacts insulatingly secured to the supporting plate in position to cooperate with said switch blades, and means adapted to connect the fixed contacts to the electrically energizable element of the electric appliance.

6. In a portable electric stove having a heating element and a frame for supporting said element, a connector-switch unit comprising a housing secured to said supporting frame, an operating member pivotally mounted within said housing, terminal means carried by said operating member and adapted to be connected to a supply cable, switch means mounted on and insulated from said operating member, said switch means being electrically connected to said terminal means, contact means mounted within and insulated from said housing, said contact means being connected to said heating element, said terminal means being arranged so that the adjacent portions of the supply cable extend in a line substantially perpendicular to said pivot, whereby the circuit to said heating element is opened and closed by a force applied laterally of the supply cable.

7. In an electric appliance comprising an element to be energized and a supply cord having an attaching plug at one end thereof, the combination of a fixed supporting plate, a terminal prong for receiving said attaching plug, means for pivotally mounting said terminal prong on said supporting plate, shiftable switch means rigid with said terminal prong and electrically connected thereto, and a contact member mounted on said supporting plate for engagement by said switch plate, said supply cord connecting with said attaching plug at a point substantially offset from said pivot whereby the circuit to said appliance may be opened and closed by a transverse component of force applied to said attaching plug.

JAMES J. GOUGH.